United States Patent

Hoashi et al.

[11] Patent Number: 6,096,367
[45] Date of Patent: Aug. 1, 2000

[54] PROCESS FOR PRODUCING MATERIALS FOR FISH PASTE PRODUCTS

[75] Inventors: Masahito Hoashi, Tokyo; Hiromi Suzuki, Chiba; Noboru Katoh, Saitama; Kikuo Tashima; Koji Masuda, both of Kanagawa; Susumu Tokushige, Saitama, all of Japan

[73] Assignee: Kabushiki Kaisha Kibun Shokuhin, Tokyo, Japan

[21] Appl. No.: 09/329,787

[22] Filed: Jun. 10, 1999

Related U.S. Application Data

[62] Division of application No. 09/000,367, filed as application No. PCT/JP96/02112, Jul. 26, 1996, Pat. No. 5,958,501.

[30] Foreign Application Priority Data

| Jul. 28, 1995 | [JP] | Japan | 7-193349 |
| Jul. 28, 1995 | [JP] | Japan | 7-193351 |
| Jul. 28, 1995 | [JP] | Japan | 7-193353 |
| Jul. 28, 1995 | [JP] | Japan | 7-193354 |

[51] Int. Cl.$^7$ ................................................. A23L 1/326
[52] U.S. Cl. ..................... 426/643; 426/518; 426/519
[58] Field of Search .................................. 426/643, 524, 426/646, 518, 519

[56] References Cited

U.S. PATENT DOCUMENTS 4,950,494  8/1990  Katoh et al. ................... 426/643 X

FOREIGN PATENT DOCUMENTS

| 0326294 | 8/1989 | European Pat. Off. ............... 426/643 |
| 53-34958 | 3/1978 | Japan . |
| 60-70049 | 4/1985 | Japan . |
| 2253860 | 10/1990 | Japan . |
| 6-133739 | 5/1994 | Japan . |

*Primary Examiner*—Arthur L. Corbin
*Attorney, Agent, or Firm*—Browdy and Neimark

[57] ABSTRACT

A process for producing materials for fish paste products which comprises the step 1 of milling a frozen ground fish meat to thereby give a frozen ground fish meat in the form of fine particles, thawing a frozen ground fish meat under milling to thereby give a thawed ground fish meat in the form of fine particles, or thawing a frozen ground fish meat and then cutting it to thereby give a thawed ground fish meat, and the step 2 of mixing under stirring the ground fish meat obtained in the step 1 with the use of a stirring means.

14 Claims, 1 Drawing Sheet

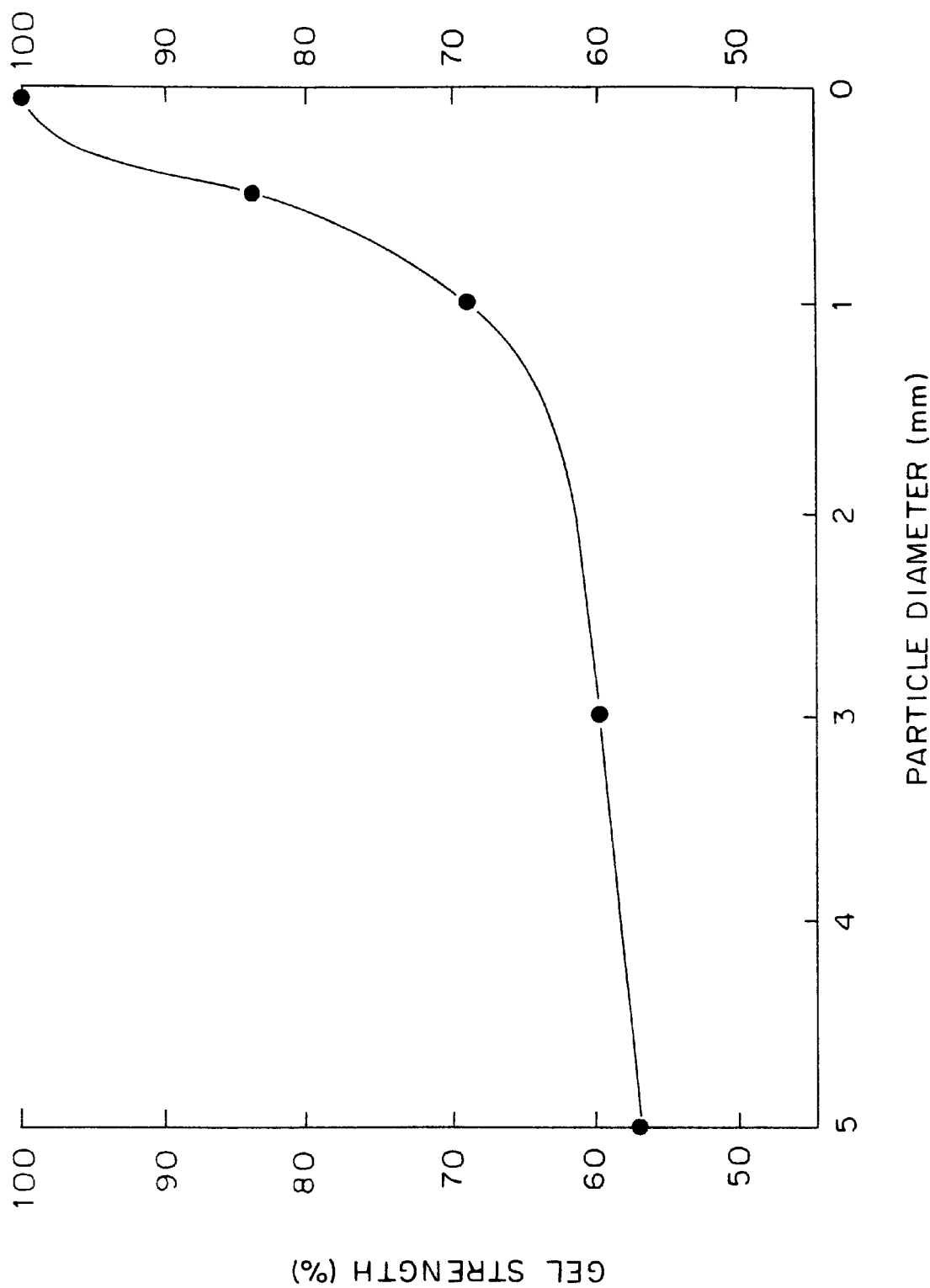

PROCESS FOR PRODUCING MATERIALS FOR FISH PASTE PRODUCTS

This is a division of parent application Ser. No. 09/000,367, filed Jan. 28, 1998, now U.S. Pat. No. 5,958,501 which is a 371 of PCT/JP96/02112, filed Jul. 26, 1996. The entire contents of each application are hereby incorporated by reference.

TECHNICAL FIELD

This invention relates to a process for producing materials for fish paste products; materials for fish paste products produced by this process; and frozen ground fish meats in the form of fine particles which are intermediates in the above-mentioned process.

BACKGROUND ART

In general, fish paste products are produced by adding sodium chloride to ground fish meat, mixing it with stirring (so-called "shio-zuri"), adding seasonings, starch, water, etc. thereto, molding the resulting mixture and then heating it. The ground fish meats employed as the starting materials are usually stored and transported in a frozen state and widely utilized as materials for producing various food products.

Fishes processed into ground fish meats are exemplified by croaker (*Nibea mitsukuri*), swordfish (*Makaira mazara*), sand borer (*Argentina semifasciatus* KISHINOUE), lizardfish (*Saurida undosquamis*), warazuka (*Stichaeus grigorjewi* HERZENSTEIN) and Alaska pollack (*Theragra chalcogramma*). In recent years, Alaska pollack, etc. have been mainly employed therefor because of the decrease in the trawl fishery catch. However, pollacks are liable to be denatured in meat qualities during the freezing step. Thus, it has been a practice to add about 5% of sugar to frozen ground fish meat for preventing the denaturation and, at the same time, to thoroughly leach the ground fish meat with water so as to eliminate water-soluble enzyme proteins and salts, which participate in the denaturation during freezing, therefrom.

Frozen ground fish meat is produced via the following steps. First, the fishes are washed. After removing the heads and internals, the fishes are washed again and the meat is collected therefrom. The fish meat thus collected is next leached with 4 to 5 times as much water so that water-soluble proteins and salts are eliminated therefrom as far as possible. Subsequently, the fish meat is pressed, dehydrated and strained. After adding 5 to 10% of sugar and 0.2% of polyphosphates, the obtained blend is well mixed. 10 kg of this mixture is packed in a polyethylene film and rapidly frozen at about −35° C. with the use of a contact freezer to thereby give frozen ground fish meat. The frozen ground fish meat is stored usually at −15 to −25° C.

The conventional process for producing fish paste products from the frozen ground fish meat thus produced comprises thawing the frozen ground fish meat by using, for example, a hot water thawing machine, crushing the ground fish meat thus thawed with a cutter, putting sodium chloride thereon and then milling it (shio-zuri). However, this conventional process leaves room for improvement, since it takes a lot of time and labor therefor. Moreover, it is necessary to further elaborate the production process per se to produce fish paste products with improved qualities.

DISCLOSURE OF THE INVENTION

An object of the present invention is to provide a process by which materials for fish paste products ensuring the production of fish paste products with good qualities can be efficiently produced. Another object of the present invention is to provide materials for fish paste products ensuring the production of fish paste products with good qualities. Another object of the present invention is to provide frozen ground fish meats in the form of fine particles which are useful in the production of excellent fish paste products. Other objects of the present invention will be apparent from the following description and the technical level at the filing date of the application.

These objects of the present invention have been achieved by providing the present invention as will be described hereinbelow.

The present invention provides a process for producing materials for fish paste products which comprises the step 1 of milling a frozen ground fish meat to thereby give a frozen ground fish meat in the form of fine particles, thawing a frozen ground fish meat under milling to thereby give a thawed ground fish meat in the form of fine particles, or thawing a frozen ground fish meat and then cutting it to thereby give a thawed ground fish meat, and the step 2 of mixing under stirring the ground fish meat obtained in the step 1 with the use of a stirring means, provided that a cake mixer is employed as the stirring means, when a frozen ground fish meat is thawed to give a thawed ground fish meat in the step 1.

The present invention further provides materials for fish paste products produced by this process. The present invention furthermore provides frozen ground fish meats in the form of fine particles having an average particle diameter of 1 mm or less which are usable as an intermediate in the above-mentioned production process.

BRIEF DESCRIPTION OF DRAWING

FIG. 1 is a graph showing the relationship between the particle diameter of the frozen ground fish meats in the form of fine particles and gel strength (refer to Test Example 1).

BEST MODE FOR CARRYING OUT THE INVENTION

In the step 1 or the process for producing materials for fish paste products according to the present invention, a frozen ground fish meat is processed into an intermediate product which can be mixed under stirring in the subsequent step 2. More particularly speaking, the procedure in the step 1 is carried out by milling a frozen ground fish meat to thereby give a frozen ground fish meat in the form of fine particles, thawing a frozen ground fish meat under milling to thereby give a thawed ground fish meat in the form of fine particles, or thawing a frozen ground fish meat and then cutting it to thereby give a thawed ground fish meat.

The frozen ground fish meat to be used in the present invention is not particularly restricted in type. In the present invention, namely, use can be made of frozen ground fish meats of various types without any limitation in fish type, composition ratio, qualities, catch area, freezing conditions, weight, shape, storage time, moisture content, seasoning contents, salt content, etc. Also, use can be made of a frozen ground fish meat containing seasonings, salt, etc. Either one frozen ground fish meat or an appropriate combination thereof may be employed in the present invention.

In the step 1 of the present invention, it is preferable to prepare a frozen ground fish meat in the form of fine particles of a thawed ground fish meat in the form of fine particles via a frozen ground fish meat in the form of fine particles. In such a case, the average particle diameter of the milled meat is regulated so that all of the particles can be uniformly thawed. More particularly, the average particle diameter is regulated preferably to 1 mm or less, still preferably to 0.5 mm or less and still preferably to 0.1 mm or less. The term "average particle diameter" as used herein means the value calculated by dividing the total of the products of each particle size by the number of the corresponding particles by the sum of the particles. That is to say, neither diameter of the largest particle nor that of the smallest one is limited in particular. It is preferable that all of the milled meat particles have diameters of 1 mm or less, still preferably 0.5 mm or less and still preferably 0.1 mm or less. The ground fish meat in the form of fine particles, the upper limit of the diameter of which has been thus determined, can be prepared by putting the ground fish meat through a sieve with a pore size corresponding to the upper limit of the particle diameter.

The frozen ground fish meat in the form of fine particles or the thawed ground fish meat in the form of fine particles can be prepared by using a mill by which ground fish meat in a frozen state can be milled. For example, use may be made therefor of a rotary mill having a rotor provided with pins or a cutter on the surface thereof by which a frozen ground fish meat can be milled or a reciprocal mill having a reciprocating board provided with pins or a cutter on the surface thereof by which a frozen ground fish meat can be milled. The milling can be performed either in a single step or in two or more steps so that the desired average particle diameter can be achieved. When the milling is performed in two or more steps, it is preferable that the ground fish meat is milled in two steps, i.e., the first step of roughly crushing and the second step of finely milling.

To prepare a frozen ground fish meat in the form of fine particles, the milling is carried out at such a temperature that the frozen ground fish meat is maintained in the frozen state. That is to say, the temperature of the frozen ground fish meat is maintained at 0° C. or below, preferably −12° C. or below, still preferably −15° C. or below and still preferably −20° C. or below. To prepare a thawed ground fish meat in the form of fine particles, a frozen ground fish meat in the form of fine particles may be once prepared and then thawed in a conventional manner. Alternatively, the frozen ground fish meat may be thawed and milled at the same time by setting the milling temperature at a relatively high level.

The frozen ground fish meat in the form of fine particles may be mixed with an aqueous solution of sodium chloride. For example, the aqueous solution of sodium chloride may be added to the frozen ground fish meat immediately after milling via an inlet therefor formed in the mill. Alternatively, the aqueous solution of sodium chloride may be added to the frozen ground fish meat outside the mill. The amount and concentration of the aqueous solution of sodium chloride may be appropriately selected within the range needed in shio-zuri. The sodium chloride may be replaced by strong electrolytes such as potassium chloride.

The frozen ground fish meat in the form of fine particles, which has been milled to give a definite particle size as being in the frozen state, is remarkably useful as a material for producing fish paste products. By using the frozen ground fish meat in the form of fine particles having a particle size of 1 mm or less, in particular, it becomes possible to produce fish paste products having highly excellent gel properties. This fact has been confirmed by examining the particle diameter of frozen ground fish meats in the form of fine particles and the gel strength of fish paste products obtained by mixing the frozen ground fish meat with an aqueous solution of sodium chloride and then stirring, molding and heating the mixture (refer to Test Example 1). FIG. 1 shows the relationship between these factors. As FIG. 1 shows, the gel strength is slowly elevated with a decrease in the particle diameter but surprisingly shows a rapid increase at the particle diameter of 1 mm or less. That is to say, fish paste products having high gel strength and excellent qualities can be efficiently produced by using frozen ground fish meats in the form of fine particles having particle diameter of 1 mm or less (refer to Test Example 2). It is also possible to delicately regulate the gel strength of fish paste products by appropriately controlling the particle diameter within the scope of the present invention. Namely, the gel strength of products can be altered by merely changing the particle diameter of the frozen ground fish meat in the form of fine particles employed as the feedstock even in a single plant operated under the same conditions, which brings about an extremely large industrial advantage.

When the frozen ground fish meat in the form of fine particles is employed, furthermore, the ground fish meat can be mixed in the frozen state with an aqueous solution of sodium chloride and then quickly treated in the subsequent step as such, which contributes to the prevention of the deterioration of the ground fish meat. When the frozen ground fish meat is thawed by the conventional process, it is unavoidable that the surface of the frozen ground fish meat alone is at first thawed and deteriorated. Moreover, the frozen ground fish meat thawed by the conventional method cannot be milled into fine particles of 1 mm or less in particle diameter, which makes it impossible to give fish paste products with high gel strength. In contrast, use of the frozen ground fish meat in the form of fine particles makes it possible to solve these problems encountering in the prior art and thus provide fish paste products with excellent qualities. In addition, the frozen ground fish meat in the form of fine particles can be easily weighed and thus makes it possible to produce a small amount of fish paste products or delicately control the amount of the ground fish meat employed which can be hardly made in the conventional method of weighing frozen ground fish meat plates.

In addition to the particularly preferable procedures as described above, the step 1 in the process for producing materials for fish paste products of the present invention involves a procedure which comprises thawing and cutting a frozen ground fish meat to thereby give a thawed ground fish meat. When this procedure is employed, however, a cake mixer should be used in the subsequent step 2. The frozen ground fish meat can be thawed in a conventional manner, for example, on a plate through which hot water about 30 to 60° C. is circulated.

The ground fish meat prepared in the step 1 is optionally mixed with an aqueous solution of sodium chloride. The amount and concentration of the aqueous solution of sodium chloride may be appropriately selected within the range needed in shio-zuri. When the frozen ground fish meat already contains a sufficient amount of sodium chloride, then this mixing step with the aqueous solution of sodium chloride is omitted. As described above, the sodium chloride may be replaced by strong electrolytes such as potassium chloride.

In this step, seasonings and food ingredients other than the ground fish meat may be added thereto. For example, addition may be optionally made of starch, mirin (sweetened sake seasoning), synthetic seasonings such as sodium glutamate, egg albumen, sugar, flavors, etc.

The mixture thus obtained my be optionally degassed. This degassing procedure may be performed depending on the type of the desired final product. To produce kamaboko, etc., it is preferable to perform this degassing. In general, the degassing is carried out after adding the aqueous solution of sodium chloride and then the degassed product is mixed with seasonings, though the order of these procedures may be appropriately altered.

After optionally degassing and/or mixing with seasonings, the obtained mixture is subjected to the mixing under stirring in the step 2. The term "mixing under stirring" as used herein involves not only literally stirring but also cutting and kneading. The mixing under stirring can be carried out by using a stirrer usable in the production of fish paste products. For example, use may be made therefor of a stone mortar type mill, a food cutter, a silent cutter, a homogenizer, a Stefan cutter (manufactured by Stefan K.K.), a kneader, a ball cutter (manufactured by Yanagiya K.K.), a capsule cutter (manufactured by Bibun K.K.), a pin mixer, a kneading machine, etc under appropriate conditions.

When the mixing under stirring is carried out by using a pin mixer, final products with high gel strength can be efficiently produced. It is, therefore, preferable in the present invention to use a pin mixer in which the feedstock is mixed with a rotor provided with pins inserted into a stator. The feedstock is supplied from one end of the stator while the mixture is discharged from another end thereof. The pins may be arranged arbitrarily without restriction. For example, use can be made of a pin mixer having a rotor with pins located thereon in spiral. By using such a pin mixer, the mixture can be continuously stirred. As a result, the efficiency in the production process of fish paste products can be largely elevated and the products can be obtained within a relatively short time while preventing the deterioration due to prolonged retention. It has been confirmed in practice that the treating time can be halved by using a pin mixer, compared with the cases wherein batch type meachines are employed. In addition, the contact of the mixture with the atmosphere during the production process is lessened, which enables hygienically preferable production. Furthermore, the elevated economical efficiency in the production brings about great advantages in practice. Shio-zuri with the use of a pin mixer is described in JP, 3-41145, B as cited herein as a reference.

In the step 2 of the process of the present invention, use may be made of a cake mixer. When a frozen ground fish meat is thawed and cut to thereby give a thawed ground fish meat in the step 1, in particular, the stirrer to be used in the step 2 is restricted to a cake mixer. The cake mixer is not restricted in type. A cake mixer consists of a stirrer and a round-bottomed bowl. The stirrer may have any sectional shape, for example, a triangular, rectangular, diamond-shaped, square, trapezoid, pentagonal, hexagonal, round or oval one. Since there is some space between the bottom of the bowl and the stirrer, no friction arises between the stirrer and the wall during stirring. Namely, it is advantageous to use a cake mixer so as to prevent the increase in the temperature of the ground fish meat. The stirring unit is covered and thus one can safely operate the mixer without touching the unit. The bowl can be conveyed separately from the stirrer. Accordingly, the bowl is usable not only in stirring/kneading but also in, for example, weighing, transporting or storing the mixture containing the ground fish meat. By using the cake mixer, a series of these operations can be completed without transferring the mixture into another container, which facilitates the operations. The cake mixer has an additional advantage that it is relatively cheap and can be easily washed because of its simple structure. By taking the stirring efficiency into consideration, it is preferable that the stirring with the cake mixer is performed under such conditions as to give the particle diameter or average particle diameter of the material of 1 mm or less.

The materials for fish paste products thus produced may be further molded and processed, by methods appropriately selected by those skilled in the art, into fish paste products such as kamaboko, chikuwa and hanpen. In usual, the processing steps involve heating, cooling, etc. The cooling may be carried out by an appropriately selected method such as allowing to cool or quenching. The fish paste products thus produced have high gel strength, good elasticity and excellent qualities.

To further illustrate the present invention in greater detail, and not by way of limitation, the following Examples will be given.

EXAMPLE 1

10 kg of frozen ground Alaska pollack meat (SA grade) was milled at −18° C. by using a marketed rotary mill having a rotor provided with a machined cutter on its surface. When the particle diameter distribution of the frozen ground fish meat in the form of fine particles thus obtained was microscopically observed, most of the particles showed particle diameters falling within the range of 1 to 0.5 mm and the average particle diameter was less than 1 mm.

Further, this frozen ground fish meat in the form of fine particles was put through 1 mm-, 0.5 mm- and 0.1 mm-sieves to thereby give frozen ground fish meats in the form of fine particles of 1 mm or less, 0.5 mm or less and 0.1 mm or less in particle diameter.

Furthermore, these frozen ground fish meats in the form of fine particles were allowed to stand at room temperature to thereby give thawed ground fish meats in the form of fine particles.

EXAMPLE 2

10 kg of frozen ground Alaska pollack meat (SA grade) was milled at −18° C. by using a marketed rotary mill having a rotor provided with a machined cutter on its surface. When the particle diameter distribution of the frozen ground fish meat in the form of fine particles thus obtained was microscopically observed, most of the particles showed particle diameters falling within the range of 0.5 to 0.1 mm and the average particle diameter was less than 0.5 mm.

Further, this frozen ground fish meat in the form of fine particles was put through 0.5 mm- and 0.1 mm-sieves to thereby give frozen ground fish meats in the form of fine particles of 0.5 mm or less and 0.1 mm or less in particle diameter.

Furthermore, these frozen ground fish meats in the form of fine particles were allowed to stand at room temperature to thereby give thawed ground fish meats in the form of fine particles.

EXAMPLE 3

10 kg of frozen ground Alaska pollack meat (SA grade) was milled at −18° C. by using a marketed rotary mill having a rotor provided with a machined cutter on its surface. When the particle diameter distribution of the frozen ground fish meat in the form of fine particles thus obtained was microscopically observed, the average particle diameter was less than 0.1 mm.

Further, this frozen ground fish meat in the form of fine particles was put through a 0.1 mm-sieve to thereby give a frozen ground fish meat in the form of fine particles of 0.1 mm or less in particle diameter.

Furthermore, these frozen ground fish meats in the form of fine particles were allowed to stand at room temperature to thereby give thawed ground fish meats in the form of fine particles.

EXAMPLE 4

To 10 kg of each of the frozen ground fish meats in the form of fine particles produced in the above Examples 1 to 3 was added 3 liters of a 14.2% aqueous solution of sodium chloride. The frozen ground fish meat mixture containing the aqueous solution of sodium chloride thus obtained was stirred in a cake mixer (manufactured by Kanto Kongoki Kogyo K.K.) for 35 minutes to thereby give a material for fish paste products.

The above procedure was repeated but using a silent cutter (manufactured by Bibun K.K.) as a substitute for the cake mixer to thereby give a material for fish paste products.

Further, the above procedure was repeated but using a pin mixer (manufactured by Kibun Shokuhin K.K.: refer to JP, 3-41145, B) as a substitute for the cake mixer to thereby give a material for fish paste products.

Furthermore, the above procedure was repeated but kneading the mixture with a kneader (manufactured by Kajihara Kogyo K.K.) for 5 minutes and optionally degassing prior to the stirring with the pin mixer to thereby give a material for fish paste products.

By using these materials, kamaboko, chikuwa and hanpen were produced. The fish paste products thus obtained were all excellent ones having high gel strength and good elasticity.

EXAMPLE 5

10 kg of frozen ground Alaska pollack meat (SA grade) was thawed by using a press thawing machine with hot water at 30° C. When measured in the thawing step, the center temperature of the ground fish meat was −5° C. Then 5 liters of a 14.2% aqueous solution of sodium chloride was added to this thawed ground fish meat and the obtained mixture was stirred in a cake mixer for 35 minutes to thereby give a material for fish paste products.

The above procedure was repeated but kneading the mixture with a kneader (manufactured by Kajihara Kogyo K.K.) for 5 minutes prior to the stirring with the cake mixer to thereby give a material for fish paste products.

TEST EXAMPLE 1

In this Test Example, fish paste products were produced by using frozen ground fish meats in the form of fine particles having various particle diameters and thus the relationship between the particle diameter and the gel properties of the obtained fish paste products was examined.

10 kg of frozen ground Alaska pollack meat (SA grade) was milled at −18° C. by using a marketed rotary mill having a rotor provided with a machined cutter on its surface. Next, this frozen ground fish meat in the form of fine particles was put through 5 mm- and 3 mm-sieves to thereby give a frozen ground fish meat in the form of fine particles having a particle diameter of 5 mm or less (sample 1) and another frozen ground fish meat in the form of fine particles having a particle diameter of 3 mm or less (sample 2). Then the test was performed by using these samples 1 and 2 together with the frozen ground fish meat in the form of fine particles having a particle diameter of 1 mm or less produced in Example 1 (sample 3), the one having a particle diameter of 0.5 mm or less produced in Example 2 (sample 4) and the one having a particle diameter of 0.1 mm or less produced in Example 3 (sample 5).

Each sample was stirred with a silent cutter in the same manner as the one described in Example 4 and then molded in a casing tube. After gelation at 35° C. for 60 minutes, it was heated to 85° C. for 30 minutes and then refrigerated overnight. Next, the gel strength was measured with a rheolometer (manufactured by Ai-Techno K.K.; 1 mm in width, wedge plunger). The results of the test are summarized in the following Table 1, while FIG. 1 shows a graph of the data. Each gel strength is expressed in a relative value calculated by referring that sample 5 as to 100%.

TABLE 1

| Sample No. | Particle size (mm) | Gel strength (%) |
| --- | --- | --- |
| 1 | 5 or less | 57 |
| 2 | 3 or less | 60 |
| 3 (invention) | 1 or less | 70 |
| 4 (invention) | 0.5 or less | 85 |
| 5 (invention) | 0.1 or less | 100 |

TEST EXAMPLE 2

In this Test Example, comparison was made between a material for fish paste products produced by stirring a frozen ground fish meat (frozen surimi) in the form of fine particles with a silent cutter and another one produced by stirring a thawed ground fish meat with a silent cutter.

10 kg of frozen ground Alaska pollack meat (SA grade) was thawed by using a press thawing machine with hot water at 30° C. When measured in the thawing step, the center temperature of the ground fish meat was −5° C. This thawed ground fish meat was milled with a silent cutter for 15 minutes and then mixed with 3 liters of a 14.2% aqueous solution of sodium chloride to thereby give a material for fish paste products (sample 6). This sample and the material for fish paste products obtained in Example 4 (sample 7), which had been produced by stirring a frozen ground fish meat in the form of fine particles with a silent cutter, were subjected to a comparison test in the same manner as the one of Test Example 1. Thus, it was confirmed that the sample 6 had a low gel strength of 75%, determined by referring the gel strength of the sample 7 as to 100%.

On the other hand, the sample of Example 5, which had been produced by stirring a thawed ground fish meat with a cake mixer to thereby give a material for fish paste products, had a significantly higher gel strength than that of the sample 6.

Industrial Applicability

Use of the process for producing materials for fish paste products of the present invention makes it possible to efficiently provide materials ensuring the production of fish paste products with good qualities. Frozen ground fish meats in the form of fine particles having average particle diameter of 1 mm or less, i.e., the intermediate products in the process of the present invention, are highly useful as materials for producing fish paste products with high gel strength and excellent qualities. Accordingly, the present invention is widely usable in the industrial fields with the use of frozen ground fish meats and applicable over an extremely broad range.

What is claimed is:

1. A process for producing materials for fish paste products which comprises
   (1) milling a frozen ground fish meat to thereby give a frozen ground fish meat in the form of fine particles having an average diameter of 1 mm of less, thawing a frozen ground fish meat under milling to thereby give a thawed ground fish meat in the form of fine particles having an average diameter of 1 mm of less, or thawing a frozen ground fish meat and then cutting it to thereby give a thawed ground fish meat having an average particle diameter of 1 mm or less,
   (2) mixing under stirring the ground fish meat so obtained with the use of a stirring device, provided that a cake mixer is employed as the stirring device when frozen ground fish meat is thawed to provide said thawed ground fish meat.

2. The process as claimed in claim 1, wherein a frozen ground fish meat in the form of fine particles or a thawed ground fish meat in the form of fine particles is prepared in step (1).

3. The process as claimed in claim 2, wherein all steps are continuously carried out.

4. A material for fish paste products produced by a process as claimed in claim 3.

5. A material for fish paste products produced by a process as claimed in claim 2.

6. The process as claimed in claim 1, wherein the stirring device is a pin mixer.

7. A material for fish paste products produced by a process as claimed in claim 6.

8. The process as claimed in claim 1, wherein said mixing is carried out in the presence of sodium chloride.

9. A material for fish paste products produced by a process as claimed in claim 8.

10. The process as claimed in claim 1, wherein degassing is performed prior to said mixing.

11. A material for fish paste products produced by a process as claimed in claim 10.

12. The process as claimed in claim 1, wherein kneading with a kneader is performed prior to said mixing.

13. A material for fish paste products produced by a process as claimed in claim 12.

14. A material for fish paste products produced by a process as claimed in claim 1.

* * * * *